US009989762B2

(12) United States Patent
Sax

(10) Patent No.: US 9,989,762 B2
(45) Date of Patent: Jun. 5, 2018

(54) OPTICALLY COMPOSITED AUGMENTED REALITY PEDESTAL VIEWER

(71) Applicant: Benjamin Sax, Los Angeles, CA (US)

(72) Inventor: Benjamin Sax, Los Angeles, CA (US)

(73) Assignee: PERCEPTOSCOPE, Los Angeles, CA (US)

( * ) Notice: Subject to any disclaimer, the term of this patent is extended or adjusted under 35 U.S.C. 154(b) by 254 days.

(21) Appl. No.: 14/513,805

(22) Filed: Oct. 14, 2014

(65) Prior Publication Data

US 2015/0269777 A1 Sep. 24, 2015

Related U.S. Application Data

(60) Provisional application No. 61/955,412, filed on Mar. 19, 2014.

(51) Int. Cl.
*G09G 5/00* (2006.01)
*G02B 27/01* (2006.01)
*G02B 23/18* (2006.01)

(52) U.S. Cl.
CPC ......... *G02B 27/0172* (2013.01); *G02B 23/18* (2013.01); *G02B 2027/0138* (2013.01)

(58) Field of Classification Search
CPC .. H04N 13/04; H04N 5/23293; H04N 5/2252; H04N 5/2254; H04N 5/33; H04N 13/0253; H04N 13/0429; H04N 2005/443; G02B 27/22; G02B 5/30; G02B 27/0172; G02B 2027/0118; G02B 2027/0123; G02B 2027/0178; G02B 2027/0112; H04W 24/08; H04W 76/02; H04W 76/023; G06T 19/006; G06T 15/00
See application file for complete search history.

(56) References Cited

U.S. PATENT DOCUMENTS

| | | | |
|---|---|---|---|
| 5,721,585 | A | 2/1998 | Keast et al. |
| 7,688,376 | B2 | 3/2010 | Kondo et al. |
| 7,924,307 | B2 | 4/2011 | Jess et al. |
| 8,248,512 | B2 | 8/2012 | Kondo et al. |
| 8,471,906 | B2 | 6/2013 | Belenkii et al. |
| 2004/0159773 | A1* | 8/2004 | Fein .................. G01N 21/6458 250/208.1 |
| 2010/0079101 | A1* | 4/2010 | Sidman ................ F16M 11/041 318/649 |
| 2012/0113223 | A1 | 5/2012 | Hilliges |

(Continued)

FOREIGN PATENT DOCUMENTS

| | | |
|---|---|---|
| JP | 10224821 | 8/1998 |
| JP | 2002374543 | 12/2002 |
| WO | WO 2012/105500 | 8/2012 |

*Primary Examiner* — Xilin Guo
(74) *Attorney, Agent, or Firm* — Cislo & Thomas, LLP

(57) ABSTRACT

A pedestal mounted augmented reality viewing system is provided. The invention comprises an augmented reality viewer and control electronics and software, mounted on a pedestal. The pedestal is capable of providing rotational movement about two independent axes and is equipped with angular position sensors or encoders which provide position information to the control electronics. The control electronics and software use positional information provided by the pedestal mounted sensors for the creation of an augmented image, via the optical system of the invention, by compositing real and virtual component images.

20 Claims, 2 Drawing Sheets

(56) References Cited

U.S. PATENT DOCUMENTS

| | | | | |
|---|---|---|---|---|
| 2013/0016320 A1* | 1/2013 | Naba | ............... | A61B 3/1025 351/208 |
| 2014/0168264 A1* | 6/2014 | Harrison | ............ | G02B 27/0176 345/633 |
| 2014/0300632 A1* | 10/2014 | Laor | ............... | G06T 19/006 345/633 |
| 2014/0300906 A1* | 10/2014 | Becker | ............ | G01B 11/005 356/614 |

* cited by examiner

OPTICALLY COMPOSITED AUGMENTED REALITY PEDESTAL VIEWER

CROSS REFERENCE TO RELATED APPLICATION

This application claims the benefit of U.S. provisional patent application No. 61/955,412 filed on Mar. 19, 2014, the entirety of which is hereby incorporated by reference.

FIELD OF THE INVENTION

The present invention relates generally to the field of augmented imaging or augmented reality where two or more images are overlaid or composited and viewed together by an observer, and more particularly to an optically composited augmented reality system utilizing a pedestal mounted viewer for use in viewing landscapes such as may be found in national and state parks and other scenic locales, as well as educational displays such as may be found in museums, schools teaching hospitals and the like. An augmented reality viewer as described above may also find application in the field of real estate development. The device could be used as a tool to pre-visualize buildings before construction begins and could serve as a means of communication between a developer and the community as a project unfolds. Other potential applications exist in the entertainment and marketing industries.

BACKGROUND OF THE INVENTION

Augmented reality is a term that is applied to composite optical images and to systems for producing composite optical images wherein the composite optical images are typically composed of superimposed or composite real and virtual images. The real image is typically an image of real objects or scenes over which is superimposed a virtual image comprised of computer generated imagery which provides an enhanced or alternative understanding of the physical object or scene.

Augmented reality systems have previously been principally implemented using head-mounted displays that are worn by users. In a typical system, a video camera captures images of the physical or real world in the direction of the user's field of view, and augments the images with virtual graphics before displaying the images on the head mounted display. Head-mounted augmented reality systems presently are complex and costly because they typically require the alignment of real imagery with virtual imagery in six-degrees-of-freedom during the compositing process. The cost and complexity of head-mounted systems renderers them generally unsuited for the purpose of providing viewers for landscapes or educational displays. A pedestal mounted augmented reality viewing system would have many advantages over a head mounted display including, but not limited to, having room for a higher resolution display, simpler electronics, and generally lower cost.

A need exists in the art of augmented reality devices for a viewing device for viewing landscapes and/or educational displays. It is believed that no such devices are presently available. Such a device would preferably be packaged in a familiar, traditional or even nostalgic form to make the device attractive and inviting to use. Ideally, the viewer would allow for reduced complexity and cost by the reducing the number of degrees of freedom needed to align the real and virtual imagery during the compositing process. In many applications, the viewer would likely be a "public" device, rather than a personal device, and would therefore be of relatively low cost to use for any particular end user.

It is the purpose of the present invention to provide a dedicated landscape or educational display viewer that incorporates augmented reality principles. Such a device would be beneficial to all observers of such landscapes and displays. For example, an observer in a national park may be provided with substantial educational information via a landscape viewer incorporating augmented reality. Landscapes when viewed with such a device may include composited information regarding details of the natural and human history of an area and may include reenactments of famous events that occurred on the landscape being viewed. Similar utility may be found in museum and other educational display settings.

SUMMARY OF THE INVENTION

The present invention is an augmented reality viewing system which utilizes an augmented reality viewer mounted on a pedestal mount similar to that of a traditional optical, binocular style, landscape viewer. Incorporating the augmented reality viewer on a pedestal mount provides for several advantages that simplify alignment of the composited real and virtual images. More specifically, a pedestal mounted viewer will typically be mounted in a predetermined location, at a predetermined height, and will sweep a predetermined field of view. This form of mounting requires the augmented reality viewing system be able to align real and virtual imagery in only two degrees of freedom, i.e. rotations about a pitch or transverse axis and rotations about a yaw or longitudinal axis. Thus, complete position information necessary for optical compositing may be supplied by two sensors, i.e. rotary encoders providing pitch and yaw information about two orthogonal axes. Translation information and rotation the remaining orthogonal axis need not be considered due to the fixed position of the pedestal mount.

In general, the pedestal mounted augmented reality viewing system of the present invention provides a device for the compositing of optical images to the eyes of an observer wherein the composite optical image includes a source image, comprising a real or physical image of a scene, along with a virtual image comprising a computer generated image that is displayed superimposed or composited upon the source image (i.e. the real or physical image).

In the exemplary embodiment, the augmented reality viewer comprises an objective lens through which the source image is directed along a first optical path extending from a real object, i.e. scene being viewed, to a beam splitter. The beam splitter then directs the source image along a second optical path through an eyepiece lens wherein the image may be observed by an observer. The second optical path extends from the beam splitter to an eye of the observer. Simultaneously, the beam splitter directs the source image along a third optical path extending from the beam splitter to an image capture device such as a camera. Contemporaneously, a virtual image to be superimposed upon the real image is generated by an image display device, the virtual image is coordinated or aligned with the real image by a computer processor ("CPU") using position information regarding the actual field of view of the objective lens supplied by pitch and yaw encoders incorporated in the pedestal mount of the viewer.

The image display device directs the virtual image along a fourth optical path to the beam splitter. The fourth optical path extends between the image display device to the beam splitter. The beam splitter then directs the virtual image along a fifth optical path extending from the beam splitter to the eye of the observer (via the eyepiece lens), wherein the second optical path overlaps with the fifth optical path with the consequent effect of superimposing or compositing the virtual image upon the real image. Simultaneously upon receipt of the virtual image projected from the image display device, the beam splitter transmits the virtual image along a sixth optical path to the image capture device, wherein third and sixth optical paths overlap and thereby the composited real and virtual mages are captured by the image capture device.

BRIEF DESCRIPTION OF THE DRAWINGS

The features and advantages of the present invention will become more readily apparent from a reading of the following detailed description, taken in conjunction with the accompanying drawing figures/

DETAILED DESCRIPTION OF THE PREFERRED EMBODIMENTS

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Figure 1:
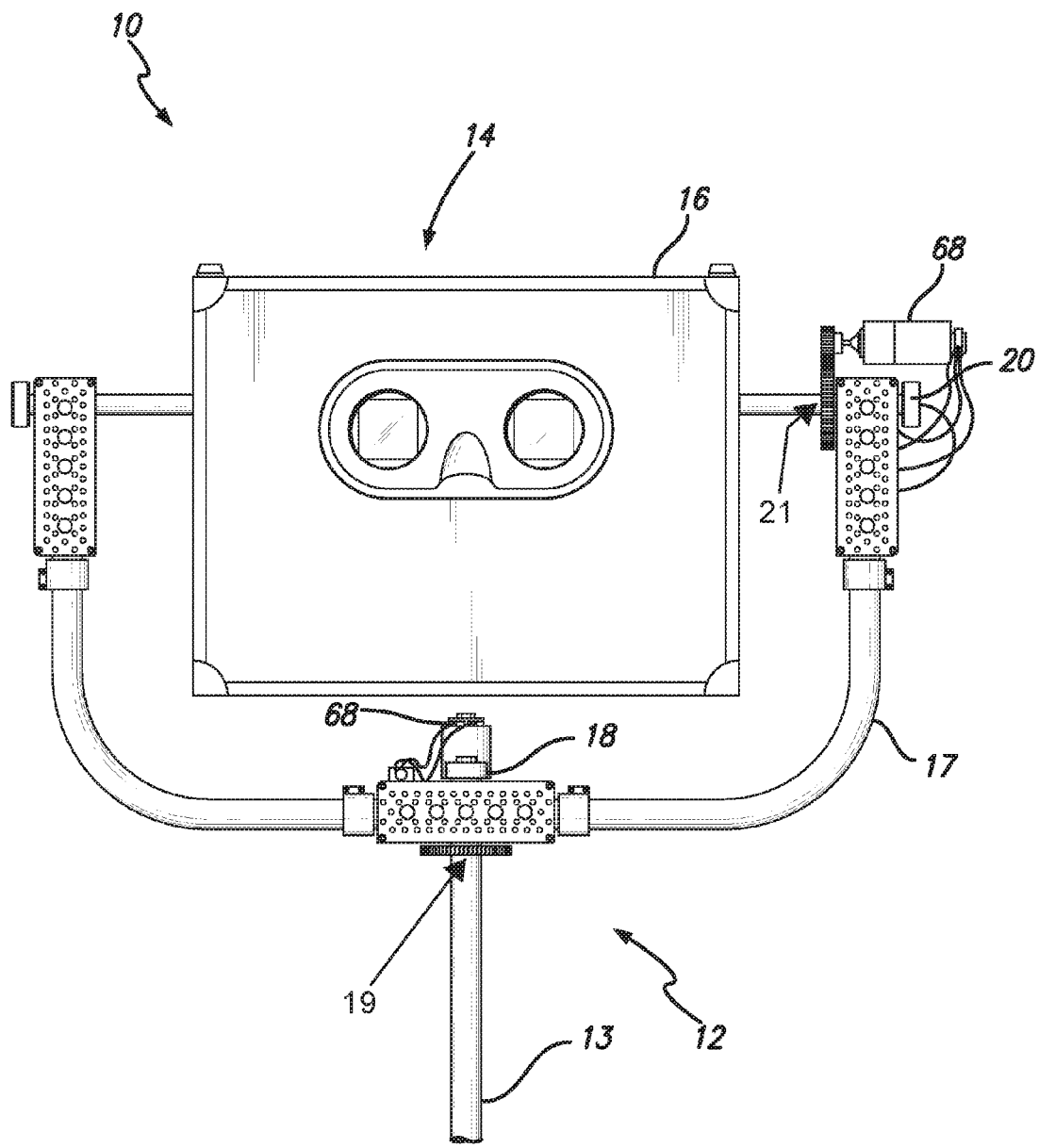
FIG. 1 is a conceptual representation of an augmented reality viewer mounted on a pedestal incorporating pitch and yaw axis encoders in accordance with the present invention.

With reference to FIG. 1, the present invention augmented reality viewing system 10 comprises a compositing viewer 14 in which the optical and electrical components of the system, with the exception of pitch and yaw sensors, are housed in a housing 16. The viewer 14 is mounted to a pedestal viewer mount 17 of a pedestal 12. The pedestal 12 is defined to include a pedestal base 13 and the pedestal viewer mount 17. The compositing viewer 14 is capable of motion in two-degrees-of-freedom, i.e. yaw and pitch motion, or rotational motion about a longitudinal axis (yaw motion) and rotational motion about a transverse axis (pitch motion) due to the viewer mount 17 being connected to the pedestal base 13 at a first joint 21 that is configured to rotate only about the longitudinal axis that is parallel to the pedestal base, and the viewer 14 being connected to the viewer mount 17 at a second joint 19 that is configured to rotate only about that transverse axis that is perpendicular to the longitudinal axis thereby limiting the viewer to only two degrees of freedom.

Incorporated in the pedestal base 13 is the first angular position measuring device or sensor 18 and incorporated in the pedestal viewer mount 17 is the second angular position measuring device or sensor 20. The first angular position sensor 18 measures the angular rotation of the viewer mount about the longitudinal or yaw axis. The second angular position sensor 20 measures the angular rotation of the viewer mount about the transverse or pitch axis. This sensor arrangement is believed most desirable for landscape style viewers. Other arrangements of the yaw 18 and pitch sensors 20 are also possible and may prove more advantageous depending upon the application. In the exemplary embodiment, the first and second angular position sensors, 18 and 20, are rotary encoders.

In the exemplary embodiment, the viewer 14 of the augmented reality viewing system 10 is a binocular style viewer, i.e. the viewer includes two identical optical systems, one for each of an observer's right and left eyes. The following description describes the components and operation of one such optical system and associated control electronics 36. Those of skill in the art will understand that the control electronics 36 will, in a complete assembly, drive two optical systems, i.e. one for each eye, both optical systems being housed in the housing 16 of the viewer 14.

Figure 2:
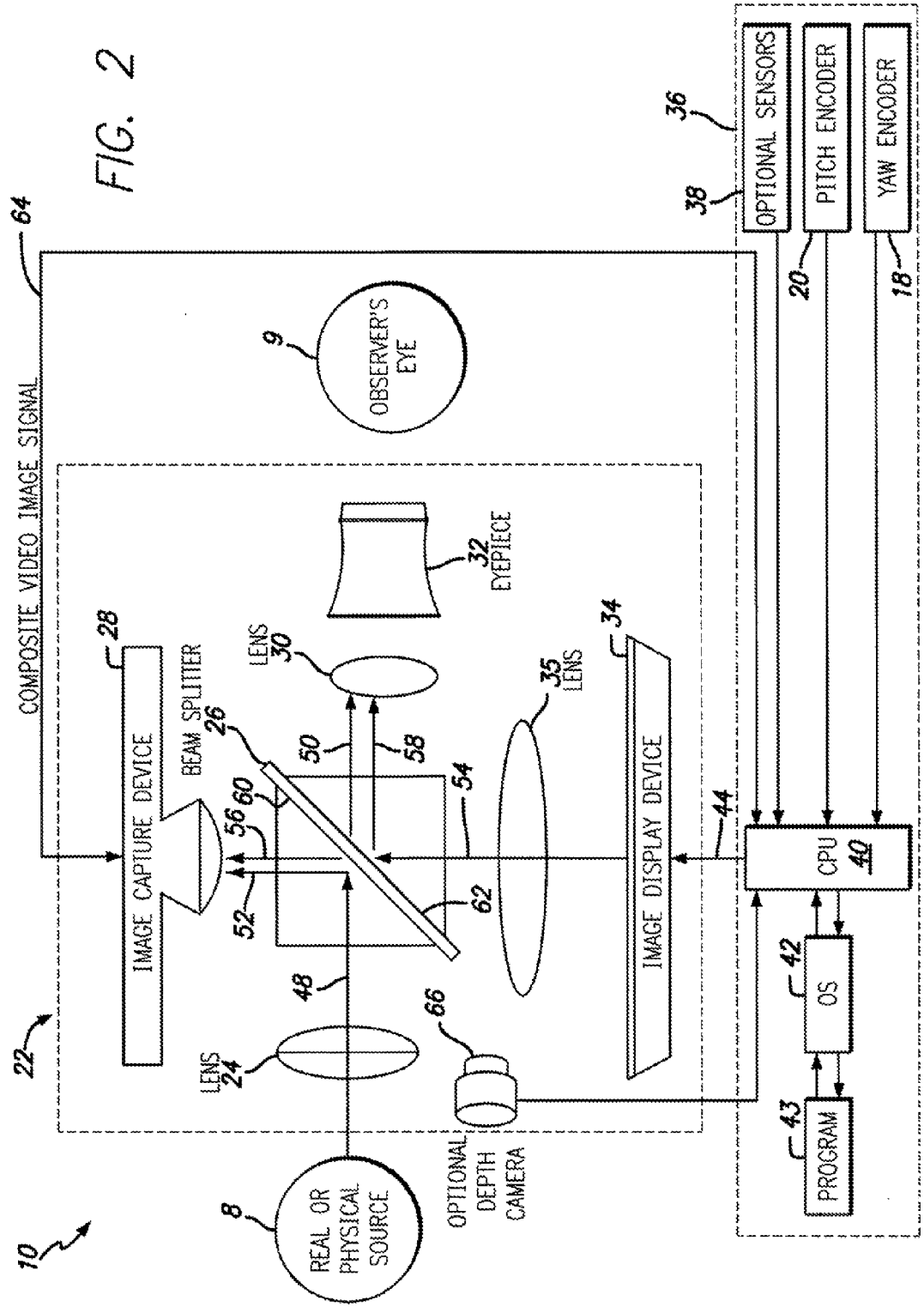
FIG. 2 is a block diagram showing representative components and component relationships of augmented reality view of the present invention.

With reference to FIGS. 1-2, the optical system 22 of the viewer 14 includes an objective lens 24, a beam splitter 26, an eyepiece lens 30, an eyepiece 32, an image capture device 28, an image display device 34, and a refractive or focusing lens 35. The image display device 34 can either be a single display shared by both right and left eye optical paths, or it could potentially be two displays, one per eye, to increase the resolution.

Associated with the optical system 22 are control electronics 36 which provide a virtual image signal 44 to the image display device 34. The control electronics 36 comprise a computer processing unit ("CPU") 40, an operating system 42, and pitch and yaw position input sensors, i.e. pitch encoder 18 and yaw encoder 20. The control electronics also comprise optional sensors 38 which may include a digital compass and/or GPS unit, as well as accelerometers and gyroscopes.

The augmented reality viewing system 10 of the present invention operates as follows: Light in the form of a real image from a real or physical source 8 is captured by the objective lens 24 and directed upon a first optical path 46 extending from the source 8 to the beam splitter 26. Upon striking a face 60 of the beam splitter 26 the real image is split into two identical component real images wherein one component real image follows a second optical path 50 extending from the face 60 of the beam splitter 26 to an eye 9 of an observer, passing through the eyepiece lens 30 and eyepiece 32. The second real image is reflected at a 90 degree angle by the beam splitter 26 and follows a third optical path 52 extending from the face 60 of the beam splitter to the image capture device 28.

As is known in the optical arts, an inherent characteristic of beam splitters, such as beam splitter prisms, is to pass ½ of the light incident upon the prism through the prism and to reflect ½ of the incident light at a 90 degree angle. The present invention makes use of this characteristic.

A feature of the augmented reality viewing system of the present invention 10 is that with the control electronics 36 turned off, i.e. when no virtual imagery is being generated, the viewer 14 will operate essentially as an ordinary landscape viewer conveying a real image from the source 8 to the eye 9 of an observer.

To provide an augmented reality experience, a virtual image may be generated by the image display device 34. The virtual image projected from the image display device 34 follows a fourth optical path 54 extending from the image display device 34 through a focusing lens 36 to a face 62 of the beam splitter 26 where the virtual image is split into two component virtual images. One of the component virtual images is directed along a fifth optical path 58 between the face 62 of the beam splitter 26 and the eye 9 of an observer, passing through eyepiece lens 30 and eyepiece 32. The second virtual image is directed along a sixth optical path 56 extending from the face 62 of beam splitter 26 to the image capture device 28.

The second optical path 50 and fifth optical path 58 are substantially parallel and are additive. As such, the virtual image carried by the fifth optical path 58 will be superimposed upon, or composited with, the real image carried along the second optical path 50. Therefore, the image seen by the eye 9 of an observer represents an augmented version of reality because the combined image contains both, real components and virtual components.

Similarly, the third optical path 52 and sixth optical path 56 are substantially parallel and are additive. As such, the virtual image carried by the sixth optical path 56 will be superimposed upon, or composited with, the real image carried along the third optical path 52. Therefore, the image captured by the image capture device 28 also represents an augmented version of reality because the combined image contains both real components and virtual components.

The augmented image created by the compositing of the real and virtual images of the second and fifth optical paths 50 and 58 is identical to that created by the compositing of the real and virtual images carried by the third and sixth optical paths 52 and 56. Therefore, a composite electronic image signal 64 generated by the image capture device 28 is an accurate representation of the composite image viewed by the eye 9 of an observer.

The control electronics 36 comprise a CPU 40 controlled by an operating system ("OS") 42 which runs graphics generation software 43. Providing position information regarding the field of view of the viewer 14 are the yaw encoder 18 and pitch encoder 20. The control electronics may be optionally be equipped with a number of additional sensors such as a compass, GPS unit, gyroscopes, and accelerometers. These sensors are collectively identified in FIG. 2 as optional sensors 38.

The control electronics 36 supply virtual images via a virtual image signal 44 to the image display device 34 for compositing, at several levels of complexity. The virtual imagery in its simplest form may be a looping stream of factual data regarding, for example, details of the natural and human history of an area which is composited on the real imagery seen by the viewer. Simple factual data may be composited, i.e. superimposed, upon the real imagery without the need for position information from external sensors or analysis and manipulation of the composite electronic image signal 64.

At another level of complexity, virtual imagery that requires spatial positional alignment with the real imagery seen by the viewer 14 may be composited using, at least in part, position information regarding the spatial position of the viewer 14 supplied by yaw encoder 18 and pitch encoder 20. Virtual imagery of this type may include, for example, imagery regarding how a landscape changed over time, or imagery showing reenactments of historical events which took place on a particular landscape.

At a yet higher level of complexity, virtual images for compositing may be created by manipulating the composite electronic video image signal 64, as well as by using, at least in part, information provided by the yaw 18 and pitch sensors 20. Manipulations may include changes to the virtual image that when composited change the lighting characteristics or spatial perception of the composited image. For example, the composited or augmented image may be made lighter or darker than that of the real image and may be manipulated to increase depth perception, change the spatial location of objects. The manipulated image may also correct for distortions introduced by the optical lenses.

Optional sensor data such as compass, gyroscope and accelerometer data may be used to increase the motion sensitivity of objects in the composited image. Additional data from other sensors such sonic range finders and laser range finders (LIDAR) may also be used to increase occlusion resolution.

In some applications, the addition to the system of an RGB depth camera 66 would also be desirable. An optional RGB-Depth or Time of Flight camera could be added facing outward towards the real or physical source 8, to generate a depth map of objects immediately in front of the view. This would allow for virtual objects to be properly masked if they happen to be appearing at a virtual depth further away than the depth of a nearby real object. This would effectively allow a greater sense of immersion by making it feel as though virtual objects have a relationship with real objects. Depth masking would happen prior to rendering the composite image, but after positional tracking has been accomplished to identify where the viewer is pointed in virtual space.

In alternative embodiments of the augmented reality viewing system of the present invention 10, the pedestal 12 may be equipped DC motors 68 on the rotational axes of the pedestal. The DC motors may be controlled via a motor controller communicating with the CPU 40. The addition of computer controlled motors on the rotational axes of the pedestal provide the potential for haptic interface features such as force feedback, as well as automated robotic features such as the ability to take a spherical 360 3D time lapse frame for playback on a VR headset or other device. In a permanent installation, the system could create time lapse imagery over years of time. The addition of DC motors to the rotational axes may potentially also allow for regenerative charging of the system.

In other alternative embodiments, payment processing for use of the system 10 may be conveniently provided by including a near field communication ("NFC") sensor either on the pedestal 12 or the viewer 14. The addition of an NFC sensor would provide a relatively simple way to interface device with smart phones and other devices equipped with payment processing software applications.

In yet other alternative embodiments, a wide variety of control systems could be added to the augmented reality viewing system 10. Such control devices include joysticks, buttons, touchpads, dials, and the like. A depth camera may also be added the system. The addition of dimmable electronic glass in front of the objective lenses may also be desirable in some applications to assist in balancing external and computer generated light.

The optical and electronic components used in the present invention may take many forms and are not to be construed as being limited to any specific type of device. The beam splitter 26 may be any beam splitting optical device including, but not limited to, beam splitting prisms and half-silvered mirrors. The image display device 34 may be essentially any electronic display device including, but not limited to, LCD displays, LED displays, plasma displays, and the like. The image capture device 28 may be any device capable of capturing optical images and converting them, to electronic form, including, but not limited to, CCD and CMOS based cameras. Similarly, suitable CPUs, angular position sensors, compasses, gyroscopes, accelerometers, and optical lenses are known in the art and need not be described in detail.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. A pedestal mounted augmented reality viewing system for conveying a composite optical image to an eye of an observer, the composite optical image comprising superimposed real and virtual images, the system comprising:
   a pedestal comprising a pedestal base and a viewer mount, the viewer mount connected to the pedestal base at a first joint that is configured to rotate only about a longitudinal axis parallel to the pedestal base;
   a viewer fixed to the viewer mount at a second joint that is configured to rotate only about a transverse axis perpendicular to the longitudinal axis, thereby limiting the viewer to only two degrees of freedom;
   control electronics to control the system;
   a first angular position measuring device affixed to the pedestal and configured to measure an angular rotation of the viewer mount about the longitudinal axis; and
   a second angular position measuring device affixed to the pedestal and configured to measure an angular rotation of the viewer mount about the transverse axis;
   the viewer comprising a beam splitter, an image display device, and an image capture device;
   wherein the beam splitter receives a real object image along a first optical path extending from the beam splitter to a real object;
   wherein the beam splitter directs the real object image along a second optical path extending from the beam splitter to an eye of an observer and along a third optical path extending from the beam splitter to the image capture device;
   wherein the image display device, acting in response to a virtual image signal from the control electronics, directs a virtual image along a fourth optical path extending from the image display device to the beam splitter;
   wherein the beam splitter directs the virtual image along a fifth optical path extending from the beam splitter to the eye of the observer and along a sixth optical path extending from the beam splitter to the image capture device;
   wherein the second and fifth optical paths are parallel and additive such that the virtual image of the fifth optical path is composited with the real object image of the second optical path to create a first composite optical image at the eye of an observer;
   wherein the third and sixth optical paths are parallel and additive such that the virtual image of the sixth optical path is composited with the real object image of the third optical path to create a second composite optical image at the image capture device;
   wherein the first and second composite images are identical; and
   wherein the control electronics generates the virtual image signal for transmission to the image capture device using angular position information from the first and second angular position measuring devices affixed to the pedestal.

2. The pedestal mounted augmented reality viewing system of claim 1, wherein the image capture device converts the second composite optical image into a second composite image signal representative of the second composite optical image.

3. The pedestal mounted augmented reality viewing system of claim 1, wherein the second composite image signal is used, at least in part, by the control electronics, to create the virtual image signal displayed by the image display device.

4. The pedestal mounted augmented reality viewing system of claim 1, wherein the first and second angular position measuring devices are rotary encoders.

5. The pedestal mounted augmented reality viewing system of claim 1, wherein the image capture device is selected from the group consisting of CCD based image sensors and CMOS based image sensors.

6. The pedestal mounted augmented reality viewing system of claim 1, wherein the image display device is selected from the group consisting of LCD, LED and plasma, displays.

7. The pedestal mounted augmented reality viewing system of claim 1, wherein the viewer includes an objective lens disposed in the first optical path between the real object and the beam splitter.

8. The pedestal mounted augmented reality viewing system of claim 1, wherein the viewer includes an eyepiece lens disposed in the second optical path between the beam splitter and the eye of an observer.

9. The pedestal mounted augmented reality viewing system of claim 1, wherein the viewer includes a focusing lens in the fourth optical path between the image display device and beam splitter.

10. A pedestal mounted augmented reality viewing system for conveying a composite optical image to an eye of an observer, the system comprising:
   a pedestal, comprising a pedestal base and a viewer mount, the viewer mount connected to the pedestal base and configured to rotate only about a longitudinal axis;
   an optical compositing viewer defining a viewing angle, wherein the optical compositing viewer is mounted on the viewer mount and configured to rotate only about a transverse axis perpendicular to the longitudinal, wherein the optical compositing viewer is capable of capturing a real image and compositing the real image with a virtual image to form a composite image;
   a first angular position sensor and a second angular position sensor, each sensor affixed to the pedestal, wherein the first angular position sensor measures the angular position of the viewer mount about the longitudinal axis and the second angular position sensor measures the angular position of the optical compositing viewer about the transverse axis and configured to sense absolute pitch and yaw coordinates of the viewing angle;
   means for generating a virtual image signal for input to the optical compositing viewer; and
   wherein the means for generating a virtual image signal uses input, at least in part, from the first and second angular position sensors to create the virtual image signal supplied to the optical compositing viewer.

11. The pedestal mounted augmented reality viewing system of claim 10, wherein the optical compositing viewer comprises a beam splitter, an image display device, and an image capture device;

wherein the beam splitter receives the real image along a first optical path extending from the beam splitter to a real object;

wherein the beam splitter directs the real object image along a second optical path extending from the beam splitter to an eye of an observer and along a third optical path extending from the beam splitter to the image capture device;

wherein the image display device, acting in response to the virtual image signal from the means for generating a virtual image signal, directs a virtual image along a fourth optical path extending from the image display device to the beam splitter; and wherein the beam splitter directs the virtual image along a fifth optical path extending from the beam splitter to the eye of the observer and along a sixth optical path extending from the beam splitter to the image capture device;

wherein the second and fifth optical paths are parallel and additive such that the virtual image of the fifth optical path is composited with the real object image of the second optical path to create a first composite optical image at the eye of an observer; and wherein the third and sixth optical paths are parallel and additive such that the virtual image of the sixth optical path is composited with the real object image of the third optical path to create a second composite optical image at the image capture device.

12. The pedestal mounted augmented reality viewing system of claim 11, wherein the first and second composite images are identical.

13. The pedestal mounted augmented reality viewing system of claim 11, wherein the second composite optical image is used, at least in part, by the means for generating a virtual image signal, to create the virtual image displayed by the image display device.

14. The pedestal mounted augmented reality viewing system of claim 10, wherein the first and second angular position sensors are rotary encoders.

15. The pedestal mounted augmented reality viewing system of claim 10, wherein the image capture device is selected from the group consisting of CCD image sensors and CMOS based image sensors.

16. The pedestal mounted augmented reality viewing system of claim 8, wherein the image display device is selected from the group consisting of LCD, LED and plasma, displays.

17. The pedestal mounted augmented reality viewing system of claim 11, wherein the viewer includes an objective lens disposed in the first optical path between the real object and the beam splitter.

18. The pedestal mounted augmented reality viewing system of claim 11, wherein the viewer includes an eyepiece lens disposed in the second optical path between the beam splitter and the eye of an observer.

19. The pedestal mounted augmented reality viewing system of claim 11, wherein the viewer includes a focusing lens in the fourth optical path between the image display device and beam splitter.

20. A pedestal mounted augmented reality viewing system for conveying a composite optical image to an eye of an observer, the system comprising:

a pedestal, having a viewer mount and a pedestal base, the viewer mount being connected to the pedestal base at a first joint and configured to rotate only about a longitudinal axis parallel to the pedestal base;

a viewer for optically compositing a real image and a virtual image to form a composite image, the viewer connected to the viewer mount at a second joint configured to rotate only about a transverse axis perpendicular to the longitudinal axis, thereby limiting the viewer to only two degrees of freedom;

first and second angular position sensors affixed to the pedestal, wherein the first angular position sensor measures the angular position of the viewer mount about the longitudinal axis and second angular position sensor measures the angular position of the viewer about the transverse axis to sense absolute pitch and yaw coordinates of a viewing angle of the viewer;

means for generating a virtual image signal for input to the viewer, wherein the means for generating a virtual image signal uses input, at least in part, from the first and second angular position sensors to create the virtual image signal supplied to the viewer.

* * * * *